United States Patent
Zhou et al.

(10) Patent No.: US 11,003,444 B2
(45) Date of Patent: May 11, 2021

(54) METHODS AND APPARATUS FOR RECOMMENDING COMPUTER PROGRAM UPDATES UTILIZING A TRAINED MODEL

(71) Applicant: Intel Corporation, Santa Clara, CA (US)

(72) Inventors: Shengtian Zhou, Palo Alto, CA (US); Mohammad Mejbah ul Alam, Milpitas, CA (US); Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 16/457,906

(22) Filed: Jun. 28, 2019

(65) Prior Publication Data
US 2019/0324731 A1    Oct. 24, 2019

(51) Int. Cl.
| | |
|---|---|
| *G06F 8/75* | (2018.01) |
| *G06K 9/62* | (2006.01) |
| *G06N 5/04* | (2006.01) |
| *G06F 8/72* | (2018.01) |
| *G06F 8/65* | (2018.01) |

(52) U.S. Cl.
CPC .......... *G06F 8/75* (2013.01); *G06F 8/65* (2013.01); *G06F 8/72* (2013.01); *G06K 9/6276* (2013.01); *G06N 5/04* (2013.01)

(58) Field of Classification Search
CPC ... G06F 8/427; G06F 8/44; G06F 8/72; G06F 8/75; G06F 8/751; G06F 8/65; G06F 8/70; G06F 8/71; G06K 9/6276; G06N 3/02–10; G06N 5/00–003; G06N 5/02–048; G06N 20/00; G06N 20/10
See application file for complete search history.

(56) References Cited

U.S. PATENT DOCUMENTS

2018/0300480 A1 * 10/2018 Sawhney .............. G06F 21/563

OTHER PUBLICATIONS

Xue, H., et al., "Machine-Learning Based Analysis of Program Binaries: A Comprehensive Study", IEEE Access, vol. 7 [online], Jun. 3, 2019 [retrieved Sep. 14, 2020], Retrieved from Internet: <URL: https://ieeexplore.ieee.org/document/8718647>, pp. 65889-65912.*

(Continued)

*Primary Examiner* — Todd Aguilera
(74) *Attorney, Agent, or Firm* — Hanley, Flight & Zimmerman, LLC

(57) ABSTRACT

An apparatus includes a software parser to generate a plurality of abstract syntax trees based on a plurality of software files, the ASTs including subtrees corresponding to a plurality of functions of the software files, a subtree encoder to generate a plurality of code vectors representative of one or more semantic properties of the subtrees, a function identifier to determine a plurality of clusters for the subtrees and assign a cluster identifier and a function label to the subtrees, a tree database to store the subtrees and map the plurality of subtrees to respective ones of cluster identifiers and function names, and a processor to: train a model based on a feature vector and the plurality of clusters stored in the tree database and predict the cluster identifier for the subtrees, based on the trained model, to identify a name of the function.

25 Claims, 8 Drawing Sheets

(56) References Cited

OTHER PUBLICATIONS

Wikipeda, "Software Maintenance," available at https://en.wikipwdia.org/w/indexoho=Softeware_maintenance&oldid=906809938, last accessed on Aug. 5, 2019. 6 pages.

Wikipedia, "Reusability," available at https://wikipedia.org/w/index.php?title-Reusability $=&oldid-905790124, last accessed on Aug. 5, 2019. 2 pages.

Bauer et al., "Understanding API Usage to Support Informed Decision Making in Software Maintenance," European Conference on Software Maintenance and Reengineering (CSMR), Szeged, Hungary, Mar. 2012. 6 pages.

Python Foundation, "Python 2.7 Release Schedule," available at https://www.python.org/dev/peps/pep-0373/, last accessed on Aug. 5, 2019, 4 pages.

Tall, Snarky Canadian, "Where are we in the Python 3 transition?" available at https://snarky.ca/thestages-of-the-python-3-transition/, last accessed on Aug. 5, 2019. 5 pages.

Klotins et al. "Software engineering in start-up companies: An analysis of 88 experience reports," Emperical Software Engineering, vol. 24, Issue 1, pp. 68-102, Feb. 2019. 35 pages.

Warren, "Apple's had a shockingly bad week of software problems," available at https://www.thevergecom/2017/12/2/16727238/apple-macos-ios-software-problems-updates last accessed on Aug. 5, 2019. 4 pages.

Alon et al. "Code2vec: Learning distributed representations of code," Proceedings of the ACM on Programming Languages, vol. 3, Issue POPL, Article 40, pp. 1-29, Jan. 2019. 29 pages.

Fluri et al. "Change distilling: Tree Differencing for Fine-Grained Source Code Change Extraction," IEEE Transactions on Software Engineering, vol. 33, Issue 11, pp. 725-743, Dec. 2007. 20 pages.

Tan et al. "relifix: Automated Repair of Software Regressions," In International Conference on Software Engineering (ICSE), Florence, Italy, May 2015. 12 pages.

* cited by examiner

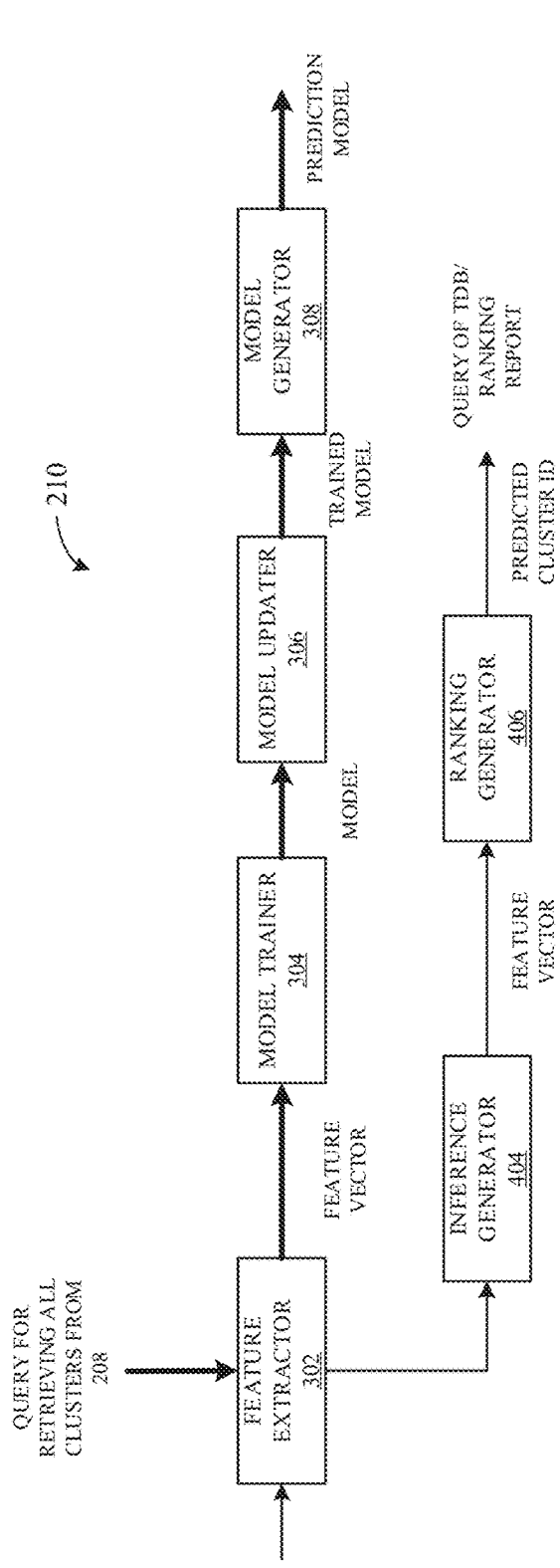
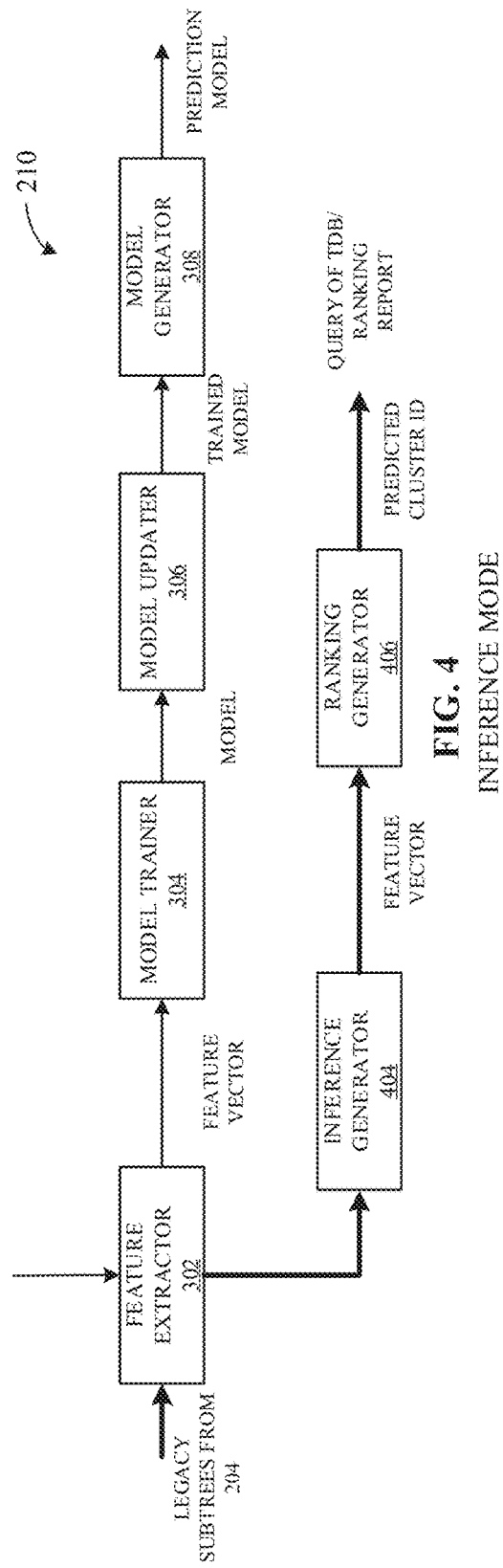

METHODS AND APPARATUS FOR RECOMMENDING COMPUTER PROGRAM UPDATES UTILIZING A TRAINED MODEL

FIELD OF THE DISCLOSURE

This disclosure relates generally to computer programs, and, more particularly, to evolving computer programs.

BACKGROUND

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

BRIEF DESCRIPTION OF THE DRAWINGS

FIG. 3 is a block diagram of an example implementation of the classifier of FIG. 2 in a training phase configured to train and generate a prediction model.

FIG. 4 is a block diagram of an example implementation of the classifier of FIG. 2 in an inference mode configured to predict cluster identifiers for subtrees and generate a ranking report based on the predicted cluster identifier.

Figure 1:
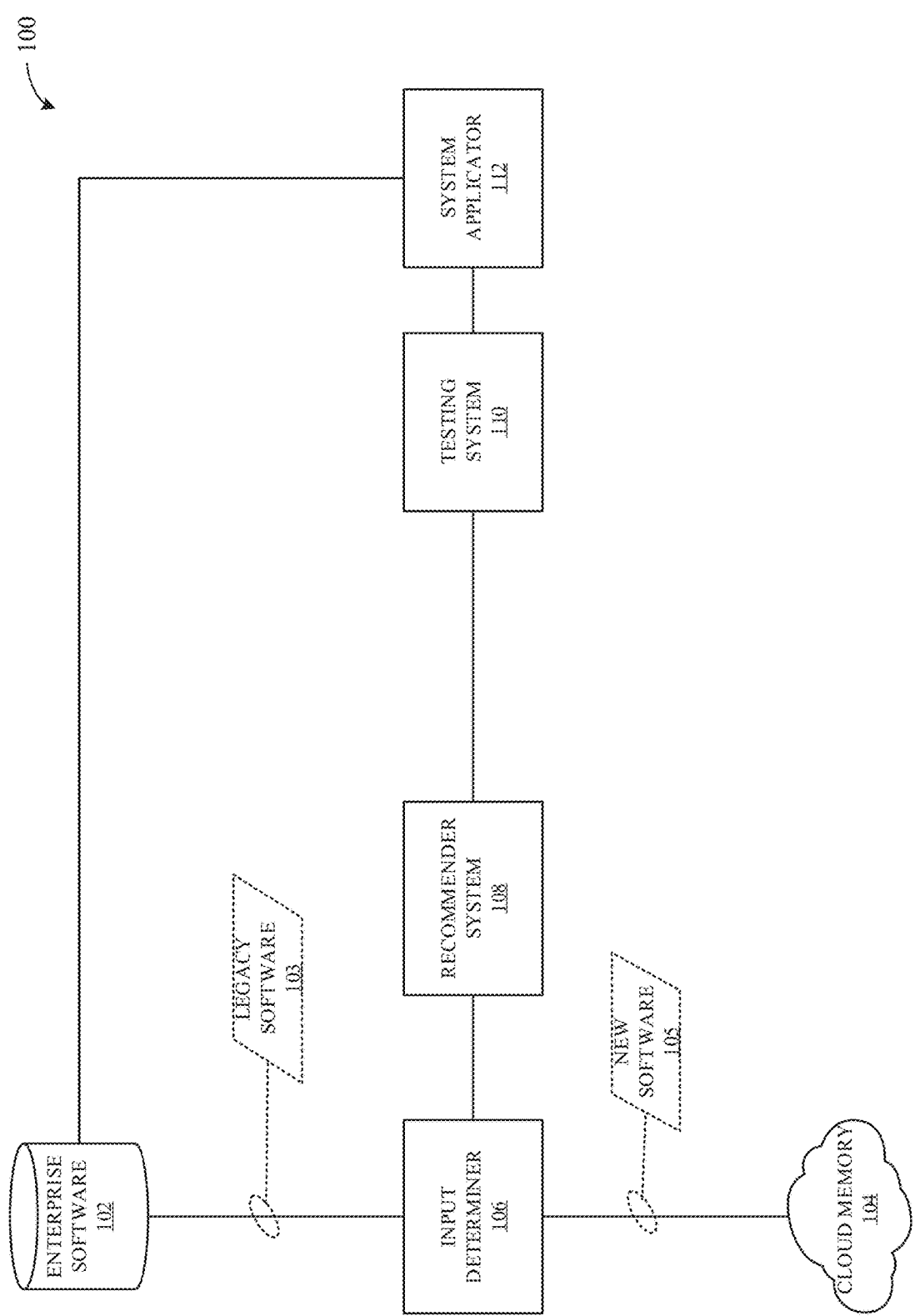
FIG. 1 is a block diagram of an example updater system to update a legacy software.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, computer programs are used in the workplace to perform various functions for employees, clients, employers, etc. Such computer programs are delivered to a client to execute functions and produce a desired output. Computer programs are constantly evolving. For example, in software engineering, "software evolution" is the term used to refer to the process of developing software initially, and then repeatedly updating it for various reasons. Such reasons include designing the computer programs to be efficient relative to the efficiency of the initial and/or previous computer program, designing a program with faster processing time, less computational storage/memory, and with higher security as to protect a user's data.

Alongside software evolution is software maintenance, which can be defined as the modification of a software product, after delivery of the product, to correct faults, to improve performance or other attributes, etc. There are two key challenges involved in the software maintenance: software reusability and maintenance timeliness. As used herein, "software reusability" is the process of implementing or updating software products using existing assets, such as blocks of code, software components, test suites, designs, and documentation. As used herein, "maintenance timeliness" is the requirement and desirability of an organization, delivering the computer programs, to solve a maintenance issue in a timely manner.

During the process of software maintenance, an organization may utilize computer programs that require support from various external application programming interfaces (API). When computer programs begin to evolve, an organization will begin the transition, which requires cost in human capital and time. For example, an example computer program 1 may have a child program "computer program 2" (e.g., a new version of the computer program 1), which is more efficient and does not include a "computer bug" that is included in computer program 1. When the organization decides to transition from computer program 1 to computer program 2, the cost of the transition may force the organization discontinue the software maintenance of other existing computer programs within the organization, resulting in inefficient software reusability. Conventional software maintenance methods are performed by humans. A software issue or a software improvement can require programmers to patch (e.g., release, send, etc.) a software update and, further, make it available to customers.

In example methods and apparatus disclosed herein, a recommendation system is utilized to improve software reusability by identifying elements (e.g., an application programming interface (API)) from alternative library databases and/or software databases to replace parts or all of a legacy software. As used herein, a legacy software is a computer system currently utilized by an organization for which a newer version or replacement software exists. Computer programmers may have a limited amount of knowledge about the wide array of software available in software libraries compared to that of library and/or software databases. For example, when a computer programmer is updating the computer program 1 to remove the "bug," he/she may only have knowledge of a limited amount of solutions to fix this "bug." However, examples disclosed herein query external databases to extract known solutions from newer and/or updated software libraries and provide the extracted solutions to the programmers for a timely fix/update.

For example, methods and apparatus disclosed herein utilize a parsing process to abstract a legacy software into individual elements identified as subtrees. A subtree is a portion of a tree data structure that can be viewed as a complete tree in itself. Any node in a tree T, together with all the nodes below it, comprise a subtree of T. A subtree is representative of an operator with operands to perform an operation and/or function of the computer program. For example, an algebraic equation, such as 3×5, is an operator where the variable "3" and the variable "5" are operands. Further, examples disclosed herein utilize AI to predict a function name for each subtree to further compare that function name to that of a new/updated software function name extracted from an external database. A list is generated and reported to a party of interest when subtrees of the legacy software are similar to that of newer software, such as a function name, a list of function names, software libraries, etc.

Many different types of machine learning models and/or machine learning architectures exist. In examples disclosed herein, a k-nearest neighbor (KNN) model is used. Using a KNN model enables input data to be analyzed based on the closest k number of instances (e.g., nearest neighbors) and returns the most common class as the prediction and for real-valued data it returns the mean of k nearest neighbors. In general, machine learning models/architectures that are suitable to use in the example approaches disclosed herein will be supervised learning models such as the KNN model. However, other types of machine learning models could additionally or alternatively be used such as support vector machine (SVM), Random Forest, Naïve Bayes, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using encoded subtrees, which are encoded after parsing a software program into an abstract syntax tree (AST). In examples disclosed herein, training is performed until multiple and accessible external software libraries have been parsed, encoded, and classified into a function name/type. In examples disclosed herein, training is performed at an edge device located at the organization. Training is performed using hyperparameters that control how the learning is performed (e.g., a learning rate, a number of layers to be used in the machine learning model, etc.). In some examples re-training may be performed. Such re-training may be performed in response to legacy software that includes little to zero similar functions as the functions stored a tree database. For example, in methods and apparatus disclosed herein, during the training phase, when external software libraries are parsed into AST, the subtrees are stored in a tree database along with an identifier. The data stored in the tree database is subsequently used during the inference phase.

Training is performed using training data. In examples disclosed herein, the training data originates from external software libraries, accessed via various external APIs. Because supervised training is used, the training data is labeled. Labeling is applied to the training data by an example function identifier. In some examples, the training data is pre-processed using, for example, a parser to parse the computer program into an AST. In some examples, the training data is sub-divided into clusters, where the clusters can be identified as a group of subtree functions of the AST.

Once training is complete, the model is deployed for use as an executable construct that processes an input and provides an output based on the network of nodes and connections defined in the model. The model is stored at the tree database (TBD). The model may then be executed by an example inference generator. In some examples, the inference generator is a processor.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a schematic illustration of a software updater system 100 to implement the methods and apparatus disclosed herein. The example software updater system 100 includes an example enterprise software database 102, an example cloud memory 104, an example input determiner, an example recommender system 108, an example testing system 110, and an example system applicator 112.

In the illustrated example of FIG. 1, the example enterprise software database 102 is coupled to the example input determiner 106 to provide legacy software 103 to the software updater system 100. The enterprise software database 102 is located at an enterprise facility that may be running outdated, old, inefficient, etc., versions (e.g., legacy software 103) of software. For example, the enterprise software database 102 may be a memory in a rack at a business facility that stores legacy software 103 and is utilized by the information technology (IT) department. The enterprise software database 102 may be queried by the example input determiner 106 when software reusability is initiated due to a need for improvement to the current legacy software 103. In other examples, the enterprise software database 102 may recognize the legacy software 103 is due for software maintenance and provide the legacy software 103 to the example input determiner 106. In some examples, the legacy software 103 is an initiation signal, determining signal, trigger, etc., to initiate the software updater system 100 to enter into an inference mode.

In the illustrated example of FIG. 1, the example cloud memory 104 is in connection with the example software updater system 100 to enable access to external APIs to further provide various software libraries to the example software updater system 100. The example cloud memory is similar to the enterprise software database 102 with the exception that it is a virtual database and therefore, hardware is not required to collect data from the external APIs. In some examples, the cloud memory 104 retrieves training data to provide to the recommender system 108. For example, the cloud memory 104 accesses software libraries to retriever new software 105. New software 105 may be any updated software accessed via external APIs. For example, new software 105 may be an improved software relative to the legacy software 103. In some examples, the new software 105 is an initiation signal, a determining signal, a trigger, etc., to initiate the software updater system 100 to enter training mode.

Figure 9:
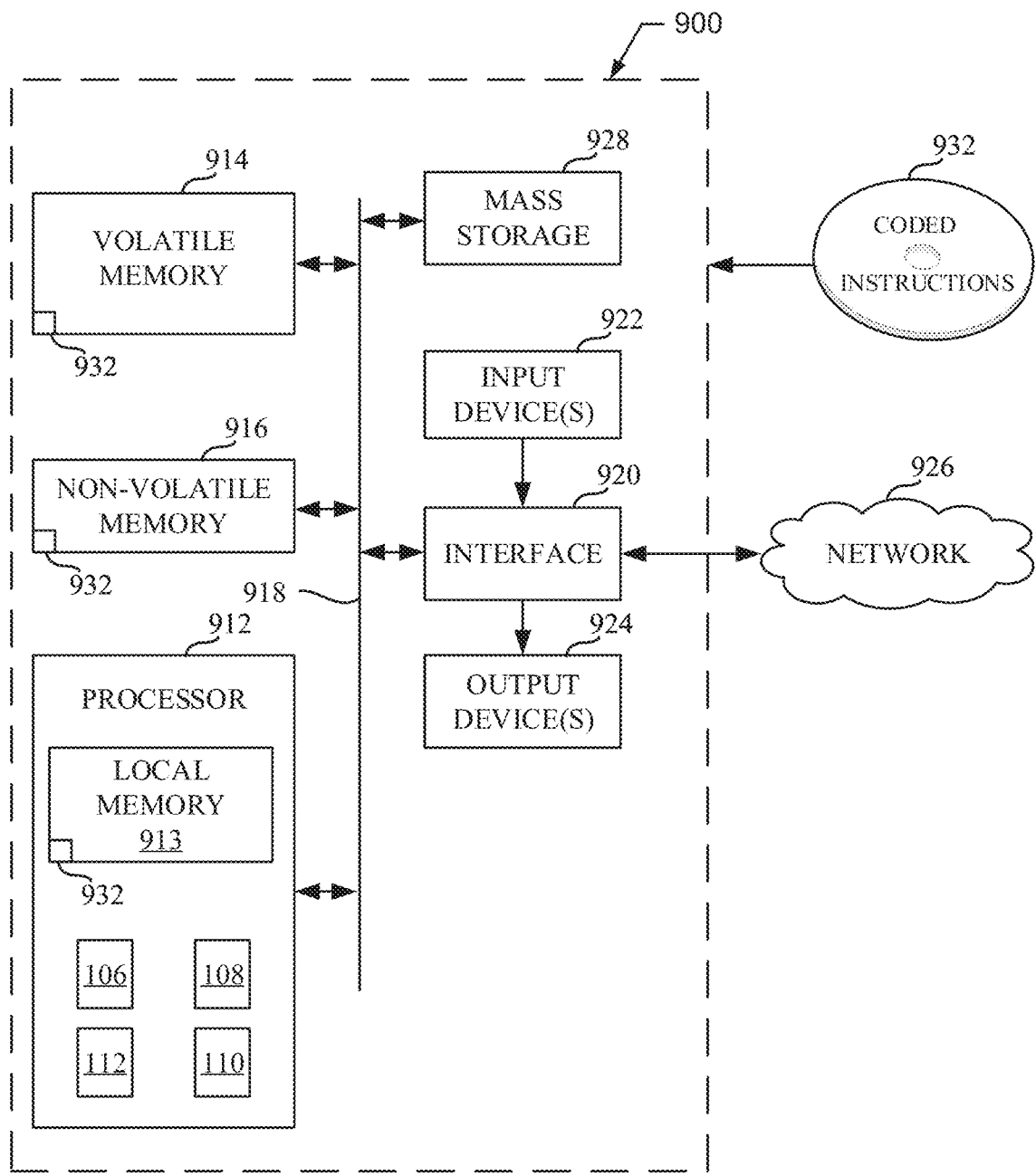
FIG. 9 is a block diagram of an example processing platform structured to execute the instructions of FIGS. 5, 6, 7, and 8 to implement the example recommender system of FIGS. 1 and 2.

In some examples, the enterprise software 102 and the cloud memory 104 are memories of a processor, such as the processor 912 of the example processor platform 900 of FIG. 9, a database server located internally, a database server located remotely at a server farm, etc.

In the illustrated example of FIG. 1, the example input determiner 106 is coupled to the example enterprise software database 102 and the example cloud memory 104 to receive input data (e.g., legacy software 103 or new software 105). The example input determiner 106 analyzes the input data to determine the purpose of the input data. For example, the enterprise software database 102 provides a legacy software 103 to the example input determiner 106, wherein the input determiner 106 analyzes the input data, such as a metadata, and notifies the recommender system 108 to enter a training process and/or an inference process. The training process and inference process are both described in further detail below in connection with FIGS. 2-4. In some examples, the input determiner 106 is an interface, such as an API, to communicate information between external sources (e.g., the cloud memory 104) and the recommender system 108.

In the illustrated example of FIG. 1, the example recommender system 108 improves software maintenance reusability and timeliness by recommending a list of new functions (e.g., software operators of new software 105, procedures of new software 105, a routine of the new software 105, etc.) to a user to replace a candidate function in the legacy software 103. For example, the recommender system 108 learns functions from new software 105, stores them in a memory, and determines what new functions are most similar to a candidate function in the legacy software 103. As used herein, "new function(s)" is a named section of the new software 105 that performs a specific task, such as returning a value or following procedural steps. As used herein. "candidate function" is a named section of the legacy software 103 that performs a specific task but requires an upgrade.

Additionally, the example recommender system 108 may recommend a software unit consisting of individual functions. A "software unit" is a computer program module together with control data, usage procedures, and operating procedures. In other examples, a unit is a testable part of an application, an entire module, an individual function or procedure, an interface, such as a class, or an individual method. The example recommender system 108 may recommend incorporating mixed code statements (e.g., conditional statements like "if, then, else") with individual functions. For example, a user has the ability to choose an individual function and add additional instructions to the function to make the function replaceable, such as adding a conditional statement.

The example recommender system 108 includes a machine learning model and an inference model, wherein the machine learning model is learned during a training phase and the inference model is generated during the training phase for use by the inference phase. In some examples, the inference model determines the name of the candidate function and a ranking generator determines the list of new functions to replace the named candidate function. The recommender system 108 is described in further detail below in connection with FIG. 2.

In some examples, the recommender system 108 improves the efficiency of software maintenance and reusability by filtering out new functions that are not relevant to update old software and providing the relevant functions to a developer for implementation. For example, the cloud memory 104 contains more software than a developer could feasibly know and/or learn in their lifetime. The recommender system 108 can identify correlations between old software and new functions in software libraries that would not be obvious for a human (e.g., a developer) to correlate. Specifically, a human cannot memorize all software libraries and programming languages, known and developed around the world, to determine possible and/or potential function updates in a timely manner.

In the illustrated example of FIG. 1, the example testing system 110 is coupled to receive the replacement function, chosen by a user, from the example recommender system 108 to determine if the replacement function meets requirements set by the example legacy software 102. For example, the testing system 110 compiles the code in the new function to check for compile errors inside the function, then further, the testing system 110 checks for compliance issues, security issues, licensing issues, etc., when the new function is fully implemented within the legacy software 103.

The example testing system 110 is initiated when a new function has replaced a candidate function of the legacy software 103. For example, the recommender system 108 provides a notification to the testing system 110 when a user chooses the replacement function to update the candidate function in the legacy software 103 to indicate that the new function requires testing before implementation. In some examples, a user may choose a replacement function, the recommender system 108 provides the replacement function to the testing system 110, and the testing system 110 tests the new function but determines it does not meet specified requirements of the legacy software (e.g., there are compile errors, licensing issues, etc.). In this manner, the testing system 110 notifies the recommender system 108 that testing failed, and the user should be prompted to choose a different new function from the list of recommended functions to replace the candidate function.

In the illustrated example of FIG. 1, the example software updater system 100 is provided with the example system applicator 112 to modify an operation of the example legacy software 103. For example, the system applicator 112 is provided with a notification from the testing system 110 that testing is complete, and actions can be taken to implement the new function into the system. The "system" may be the tasks and procedures combined to operate as the legacy software 103. In some examples, the system applicator 112 improves/updates the legacy software 103 by utilizing the recommendation set forth by the recommender system 108.

Figure 2:
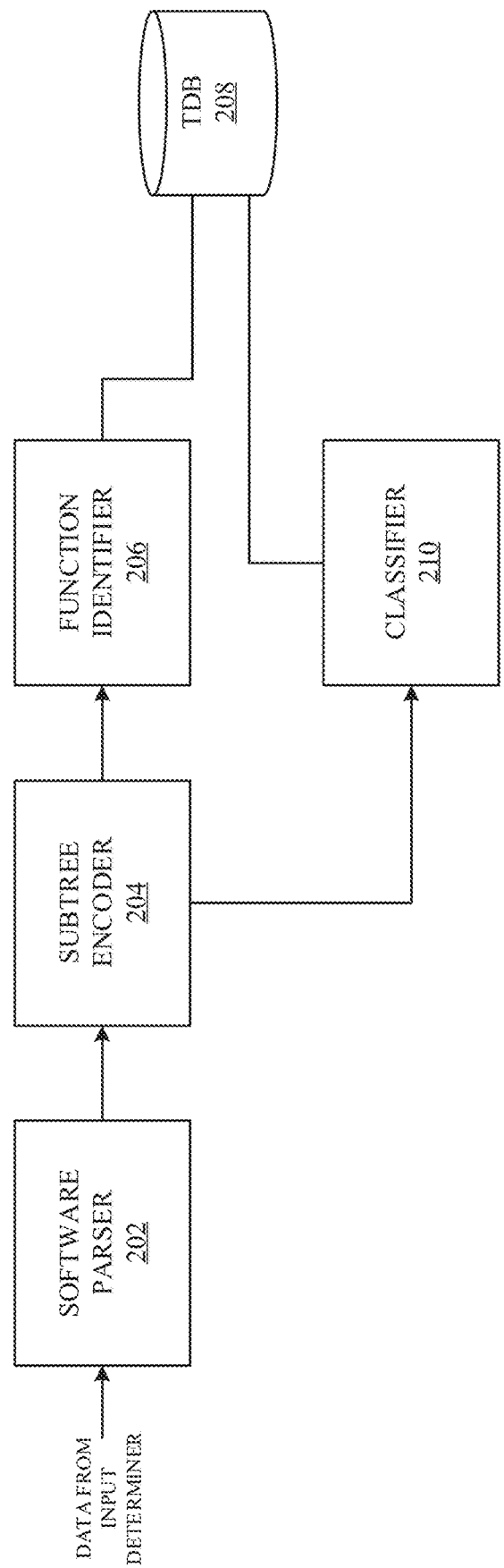
FIG. 2 is a block diagram of an example implementation of the recommender system of FIG. 1.

FIG. 2 is a schematic illustration of the recommender system 108 of FIG. 1 configured to recommend a list of replacement functions for a legacy software 103. The example recommender system 108 includes an example software parser 202, an example subtree encoder 204, an example function identifier 206, an example tree database (TDB) 208, and an example classifier 210.

In the illustrated example of FIG. 2, the example recommender system 108 is provided with the example software parser 202 to receive software from the example input determiner 106 (FIG. 1) and parse the software into subtrees of an abstract syntax tree (AST). A parser (e.g., the software parser 202) is a compiler or an interpreter component that breaks data into smaller elements for simple translation into another language. The example software parser 202 takes input data (e.g., legacy software 103 and/or new software 105) in the form of a sequence of tokens or program instructions and builds a data structure in the form of an AST. For example, the data structure may consist of several subtrees that form the AST. Additionally and/or alternatively, the example software parser 202 builds a data structure in the form of a parse tree.

Some conventional methods to parse software include top-down parsing and bottom-up parsing. Top-down parsing builds subtrees of an AST for the input string of a function, starting from root node (e.g., the main operator) and creating the leaves (e.g., operands) of the AST in pre-order. Top-down parsing can be done by leftmost derivation for an input string of a function. Bottom-down parsing builds an AST starting from the leaves and works up to the root node. The example software parser 202 may utilize either top-down parsing or bottom-up parsing to build the AST. Additionally, the example software parser 202 may utilize any other parsing method to build an AST.

In the illustrated example of FIG. 2, the example recommender system 108 includes the example subtree encoder 204 to encode a subtree built by the example software parser 202. As used herein, encoding is the process of putting a sequence of characters (e.g., letters, numbers, punctuation, and certain symbols) into a specialized format for efficient transmission or storage. The example subtree encoder 204 is to represent a subtree as a single fixed-length code vector, which can be used to predict semantic properties (e.g., the meaning of the syntactical structure of each line of code) of the subtree. Representing the subtree as a code vector can be performed by decomposing code to a collection of paths in the code's AST, and learning the atomic representation (e.g., an unchangeable, irreducible, indivisible, object or unitary action) of each path (e.g., subtree) simultaneously while learning how to aggregate a set of the subtrees. For example, the subtree encoder extracts syntactic paths from within a code snippet (e.g., a subtree), maps each path to its corresponding real-valued vector representation, then concatenates each vector into a single vector that represents the path context. As used herein, a single fixed-length code vector is a descriptive string of text indicative of the semantic properties of the subtree. The code vector can be used for various tasks, such as by the example function identifier 206 to determine a likely name for the code snippet (e.g., subtree).

In the illustrated example of FIG. 2, the example recommender system 108 includes the example function identifier 206 to receive encoded subtrees from the example subtree encoder 204, create k clusters of encoded subtrees, and tag/assign each cluster with a cluster identifier. In some examples, the function identifier 206 is only initiated during a learning/training phase of the example recommender system 108. For example, the recommender system 108 enters a learning phase when new software 105 is provided to the input determiner 106 to be learned by the example classifier 210. The example function identifier 206 creates k clusters, wherein k is the number of clusters created. In some examples, the function identifier 206 utilizes clustering algorithms to create k clusters of the encoded subtrees. For example, the function identifier 206 utilizes k-means clustering. K-means clustering begins by selecting a number of classes/groups identified during the encoding process and randomly initializing their respective center points.

To determine the number of classes to use, the example function identifier 206 analyzes the encoded subtrees for distinct groupings, such as similar semantic properties. The center points of the classes are code vectors of the same length as each data point, wherein a data point and a center point are both code vectors identifying semantic properties of the subtrees. Each data point is classified by computing the distance between the position of the data point and the randomly initialized center point and classifying the data point to be in a group with the closest center point. For example, there may be three center points. In this example, the first center point represents a "for loop" group (e.g., a control flow statement for specifying iteration, which allows code to be executed repeatedly), the second center point represents a "while loop" group (e.g., control flow statement that allows code to be executed repeatedly based on a given Boolean condition) and the third center point represents a "counter" function group (e.g., a function that counts a number of times a sequential event occurs). A data point (e.g., a code vector) with similar properties as the first center point will be grouped in the first group and tagged with cluster id number 1, a data point with similar properties as the second center point with be grouped in the second group and tagged with cluster id number 2, etc.

In k-means clustering algorithm, the example function identifier 206 recomputes the group center of the three example groups, after each data point has been grouped, by taking the mean (e.g., average) of the vectors in each group. In some examples, the example function identifier 206 continues this process of recomputing center points until the group centers do not vary greatly between iterations. The example function identifier 206 assigns a function name to each cluster (e.g., group). For example, cluster 1 may be assigned function name "while loop," cluster 2 may be assigned function name "for loop," cluster 3 may be assigned function name "timer," etc. The function names are not limited to the example semantic properties mentioned herein. Alternatively, the function names can narrowed to specific types multiple loop functions, timer functions, conditional statements, and a plurality of other semantic properties of programming languages. Additionally or alternatively, the example function identifier 206 may use different clustering algorithms such as mean-shift clustering, density-based spatial clustering of application with noise (DB-SCAN), Expectation-Maximization (EM) Clustering using Gaussian Mixture Models (GMM), Agglomerative Hierarchical Clustering, etc.

In the illustrated example of FIG. 2, the example TDB 208 receives encoded subtrees, cluster identifiers, and function names from the example function identifier 206 and stores the subtrees along with their respective cluster identifiers and function names. The example TDB 208 may map encoded subtrees to a cluster identifier and function name determined by the example function identifier 206. In some examples, the TDB 208 is a non-volatile memory such as the non-volatile memory of 916 of FIG. 9, a main memory, or a local memory such as the local memory 913 of FIG. 9.

In the illustrated example of FIG. 2, the example classifier 210 operates in one of two phases. The first phase is the training phase and the second phase is the inference phase. The example classifier 210 utilizes the input data to determine which phase the example classifier 210 enters. For example, the classifier 210 enters the training phase when the classifier 210 receives and/or retrieves data from the example TDB 208. In this manner, the data stored in the example TDB 208 corresponds to training data to guide and control how learning is performed. When the example classifier 210 enters the training phase, the example classifier 210 builds a model, wherein the model is used to guide how input data will be transformed into output data.

The example classifier 210 enters the inference phase when the example classifier 210 receives data from the example subtree encoder 204. For example, the subtree encoder 204 may directly provide a parsed legacy software 103 to the example classifier 210 for classification of legacy subtrees. During the inference phase, the example classifier 210 utilizes a model trained by the example classifier 210 during the training phase, to classify subtrees of the legacy software 103 into one of k classes and function names. The example classifier 210 is described in further detail below in connection with FIGS. 3 and 4.

While an example manner of implementing the recommender system 108 of FIG. 1 is illustrated in FIG. 2, one or more of the elements, processes and/or devices illustrated in FIG. 2 may be combined, divided, re-arranged, omitted, eliminated and/or implemented in any other way. Further, the example software parser 202, the example subtree encoder 204, the example function identifier 206, the example classifier 210, and/or, more generally, the example recommender system 108 of FIG. 1 may be implemented by hardware, software, firmware and/or any combination of hardware, software and/or firmware. Thus, for example, any of the example software parser 202, the example subtree encoder 204, the example function identifier 206, the example classifier 210, and/or, more generally, the example recommender system 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example software parser 202, the example subtree encoder 204, the example function identifier 206, and/or the example classifier 210, is/are hereby expressly defined to include a non-transitory computer readable storage device or storage disk such as a memory, a digital versatile disk (DVD), a compact disk (CD), a Blu-ray disk, etc. including the software and/or firmware. Further still, the example recommender system 108 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIGS. 3 and 4 are block diagrams that implement the example classifier 210 of FIG. 2 to operate in a training mode and an inference mode. FIG. 3 illustrates a block diagram of the example classifier 210 that is configured to train and generate a model to identify a cluster identifier and function name of a subtree. FIG. 4 illustrates a block diagram of the example classifier 210 that is configured to predict cluster identifiers for subtrees of legacy software 103 and generate a ranking report based on the predicted cluster identifier. The example classifier 210 of FIGS. 3 and 4 include an example feature extractor 302, an example model trainer 304, an example model updater 306, an example model generator 308, an example inference generator 404, and an example ranking generator 406.

Turning to FIG. 3, the example classifier 210 initiates the training mode, which selects a first path for input data to follow. For example, if the feature extractor 302 receives a query for retrieving all clusters from the example TDB 208, then training mode is initiated. The first path of the example classifier 210 is represented by the bolded arrows connecting the example model trainer 304 to the example feature extractor 302 and to the example model updater 306 and connecting the model updater 306 to the example model generator 308. In some examples, the feature extractor 302, the model trainer 304, the model updater 306, and the model generator 308 are communicatively coupled, coupled by wires such as trace lines, etc.

The example classifier 210 is provided with the example feature extractor 302 to generate a feature vector based on a query for retrieving k clusters from the example TDB 208. The example feature extractor 302 generates or builds derived values of feature vectors (e.g., representative of features in input cluster data, such as function names) that are to be informative and non-redundant to facilitate the training phase of the example classifier 210. As used herein, a feature vector is an n-dimensional array (e.g., a vector) of features that represents function names, sematic properties, etc. For example, a feature could be a representation of a subtree in the new software 105. The example feature extractor 302 reduces the input data (e.g., the clustering data from the TDB 208) into more manageable groups (e.g., features) for processing, while describing original input programming data with sufficient completeness and accuracy. In the illustrated example of FIG. 3, the feature extractor 302 identifies features in a plurality new software that corresponds to semantic properties and the software similarity. The feature data provided by the example feature extractor 302 facilitates the example model trainer 304 in training a model to predict cluster identifiers for subtrees of legacy software 103.

The example classifier 210 is provided with the example model trainer 304 to train a model based on the output feature vector of the example feature extractor 302. The model trainer 304 operates in a training mode where the model trainer 304 receives a plurality of training data, generates a prediction, and outputs a model based on that prediction. For example, to generate a model, the model trainer 304 receives feature vectors corresponding to pre-classified subtrees. For example, during a training mode, subtrees representative of multiple new software have been pre-assigned cluster identifiers and function names so that the data provided to the classifier 210 is suitable for learning. For example, the model trainer 304 receives a feature vector indicative of intended cluster identifiers that maps the intended cluster identifiers to a target (e.g., the classification that the model wants to predict) and outputs a model that captures these patterns. In some examples, the model trainer 304 outputs multiple predicted clusters. For example, a subtree may contain different functions (e.g., semantic properties), and may include more than one class, thus resulting in more than one cluster identifier. In some example, the model trainer 304 may provide the output model to the example model updater 306 in cases when a new software, different than the software previously trained, has been provided to the input determiner 106.

An example manner of implementing the model trainer 304 for new software is to utilize the model trainer 304 to identify nearest neighbors between classes of subtrees. For example, k-nearest neighbors algorithm (k-NN) is a method that utilizes a database (e.g., the example TDB 208) in which the data points (e.g., subtrees) are separated into several classes to predict the classification of a new sample point (e.g., legacy subtrees). The output of a KNN is a class membership (e.g., a cluster identifier for each legacy subtree). For example, the output is a prediction of a class. An object (e.g., a subtree of new software) is classified by a majority vote of its neighbors, with the object being assigned to the class most common among the object's k nearest neighbors. The example model trainer 304, during training mode, utilizes the KNN algorithm to plot feature vectors in groups pre-assigned to them by the example function identifier 206. Additionally, the example model trainer 304 may utilize other machine learning algorithms to train a model to classify subtrees into cluster identifiers. For example, the model trainer 304 may utilize Random Forest, SVM, Naïve Bayes, etc.

The example classifier 210 is provided with the example model updater 306 to flag a trained model as new and/or updated. For example the model updater 306 can receive a model from the model trainer 304 that provides a prediction algorithm to predict cluster identifiers for subtrees of legacy software 103. The example model updater 306 determines that a model of this type is new and, therefore, tags it as new. Alternatively, the example model updater 206 determines that a model of this type has been generated previously and, therefore, will flag the model most recently generated as updated. The example model updater 306 provides the new and/or updated model to the example model generator 308.

The example classifier 210 is provided with the example model generator 308 to generate a model for publishing. For example, the model generator 308 may receive a notification from the model updater 306 that a new and/or updated model has been trained and the model generator 308 may create a file in which the model is published so that the model can be saved and/or stored as the file. In some examples, the model generator 308 provides a notification to the input determiner 106 that a model is ready to be transformed and published.

Turning to FIG. 4, the example classifier 210 initiates an inference mode, which selects a second path for input data to follow. For example, if the feature extractor 302 receives legacy subtree from the example subtree encoder 204, then inference mode is initiated. The second path of the example classifier 210 is represented by the bolded arrows connecting the example feature extractor 302 to the example inference generator 404 and the example inference generator 404 to the example ranking generator 406. In some examples, the feature extractor 302, the inference generator 404, and the ranking generator 406 are communicatively coupled, coupled by wires such as trace lines, etc.

The example classifier 210 is provided with the example feature extractor 302 to extract features of legacy subtrees and generate a feature vector(s) to provide to the example inference generator 404. In some examples the feature extractor 302 does not extract features of new software (e.g., new software 105) in inference mode. The example feature extractor 302 extracts semantic properties of legacy software 103 that may be unknown and/or unprocessed before. For example, the feature extractor 302 may receive legacy software 103 that is outdated, old, dysfunctional, inefficient, etc., and determine features of the legacy software 103, such as the logic structures of each subtree encoded by the example subtree encoder 204.

The example classifier 210 is provided with the example inference generator 404 to generate a prediction based on a feature vector provided by the example feature extractor 302. For example, the inference generator 404 may generate a probability value indicative of the likelihood that the legacy subtree is in a certain group/class. For example, the feature vector provided by the example feature extractor 302 may include information indicative of a function name or an operation type of the legacy subtree. In this manner, the example inference generator 404 determines a plot location of the feature vector and then calculates the distance of the feature vector from previously plotted feature vectors (e.g., data points, center points, etc.). The example inference generator 404 groups the feature vector indicative of the legacy subtree with a data point and/or group that the feature vector is closest too, relative to the calculated distance values. For example, the inference generator 404 utilizes the trained model (e.g., the KNN algorithm) to determine the group that is the most similar to the features in the feature vector provided by the example feature extractor 302. For example, the feature vector may include a feature and/or features similar to that of a while loop, in which of the three groups mentioned above in connection with the example function identifier 206 of FIG. 2, the first group corresponding to function name "while loop," would be most similar to that particular feature vector. In this manner, the example inference generator 404 would predict that the legacy subtree falls into cluster 1, and therefore flag the legacy feature vector with a cluster identifier "1."

In some examples, the legacy software 103 includes a plurality of subtrees, and the example inference generator 404 predicts one or more cluster identifiers (e.g., k clusters) for each subtree. For example, the feature extractor 302 provides a feature vector for each legacy subtree, in which the inference generator 404 predicts a cluster identifier for each feature vector provided by the example feature extractor 302. In some examples, the feature extractor 302 provides the features vectors to the inference generator 404 at the same time. In this manner, the example inference generator 404 is a multi-class inference generator and is trained to analyze multiple classes (e.g., groups, clusters, etc.) and will output a correct cluster identifier for each feature vector (e.g., each encoded legacy subtree).

The example classifier 210 is provided with the example ranking generator 406 to receive the predicted cluster identifiers for each legacy feature vector and generate a ranking report based on the function names of the legacy subtrees and the function names of the new software subtrees previously identified and stored in the example TDB 208. For example, the ranking generator 406 receives the classification of a legacy subtree and queries the TDB 208 for subtrees assigned with the same cluster identifier. Then, the example ranking generator 406 determines similar function types of the legacy subtree and the retrieved subtrees. For example, in subtrees grouped in cluster identifier 1 may include the function name "while loop," but not every "while loop" in each retrieved subtree will be the same type of "while loop" as the legacy subtree. In this manner, the example ranking generator 406 compares the assigned function name from the retrieved subtrees to the classified function name determined by the example inference generator 404.

An example manner of implementing the ranking generator 406 to rank the subtrees by similarity to the legacy subtree is to utilize the bigram string similarity measure. The bigram string similarity first determines labels (l) and values (v) for each node n in a subtree. For example, the function identifier 206 may assign a type of statement as the node label l(n), such as IF for an if-statement or WL for a while loop. The example function identifier may also map the label of the node with the value of the node, for example, the condition expression for IF could be "a<b." After the bigram string similarity analyzes the labels and value for each node in a subtree, the bigram string similarity detects changes between two subtrees (e.g., legacy subtree and at least one of the retrieved subtrees) based on labels, l, and values, v, of each node in the subtrees and calculates a distance score for each retrieved subtree relative to the legacy subtree. For example bigram compares two or more strings of text, such as label names, and generates a score (e.g., Dice coefficient based on bigram, defined as the ratio of the number of bigrams that are shared by two strings and the total number of bigrams in both strings). For example, the Dice coefficient of string "hello" and "yellow" is measured in the following manner: "hello" contains bigrams "he", "el", "ll", and "lo", whereas "yellow" contains bigrams "ye", "el", "ll", "lo", and "ow". The shared bigrams of the two strings are "el", "ll", and "lo". The Dice coefficient of the two strings is 2 times the number of shared bigrams divided by the total number of bigrams from the two strings: 2*3/(4+5)=0.67. The higher the Dice coefficient, the more similar the two strings.

When the example ranking generator 406 utilizes the bigram string similarity measure algorithm, the example ranking generator 406 ranks the subtrees from lowest distance score to highest distance score, wherein the lowest distance score is the subtree that is most similar to the legacy subtree and the highest distance score is the subtree that is least similar to the legacy subtree. In some examples, the subtree with the highest score is ranked first, depending on the chosen scoring method (e.g., the Dice coefficient). For example, the ranking generator 406 ranks each retrieved subtree in a cluster based on text-based similarity of function names and may further rank the subtrees based on node values, v, when two or more subtrees have the same rank and need to be further differentiated. Additionally, the example ranking generator 406 may utilize any text-based algorithm to compare subtrees to a legacy subtree to generate a ranking report. For example, the ranking generator 406 may utilize trigram string similarity measure algorithms, Levenshtein Distance algorithm. Dice Coefficient measure algorithm, etc.

The example ranking generator 406 generates the ranking report and provides the report to a user interface for a programmer, developer, etc., to view. For example, the report may include a list, in ascending order, of functions that can be utilized to fix, replace, and/or update the corresponding function of the legacy software 103. In this example, the developer may select one of the functions in the ranking report and apply the fix to the legacy software. In other examples, the ranking generator 406 may provide the ranking report to an automated script (e.g., a YAML file includes the execution of a program that fulfills the intended user functionality, for example, check functions in the list and determine the fix) to check the functions in the list and determine the fix (e.g., function) that transforms the legacy software 103 into a success or improved implementation.

While an example manner of implementing the classifier 210 of FIG. 2 is illustrated in FIGS. 3 and 4, one or more of the elements, processes and/or devices illustrated in FIGS. 3 and 4 may be combined, divided, re-arranged, omitted, eliminated and/or implemented in any other way. Further, the example feature extractor 302, the example model trainer 304, the example model updater 306, the example model generator 308, the example inference generator 404, the example ranking generator 406, and/or, more generally, the example classifier 210 of FIG. 1 may be implemented by hardware, software, firmware and/or any combination of hardware, software and/or firmware. Thus, for example, any of the example feature extractor 302, the example model trainer 304, the example model updater 306, the example model generator 308, the example inference generator 404, the example ranking generator 406, and/or, more generally, the example classifier 210 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example feature extractor 302, the example model trainer 304, the example model updater 306, the example model generator 308, the example inference generator 404, and/or the example ranking generator 406, is/are hereby expressly defined to include a non-transitory computer readable storage device or storage disk such as a memory, a digital versatile disk (DVD), a compact disk (CD), a Blu-ray disk, etc. including the software and/or firmware. Further still, the example classifier 210 of FIG. 2 may include one or more elements, processes and/or devices in addition to, or instead of, those illustrated in FIGS. 3 and 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the example software updater system 100, the recommender system 108, and the classifier 210 of FIGS. 1, 2, 3, and 4 are shown in FIGS. 5, 6, 7, 8, and 9. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 5, 6, 7, 8, and 9, many other methods of implementing the example software updater system 100, the recommender system 108, and the classifier 210 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 5, 6, 7, 8, and 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B. (5) A with C. (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 5:
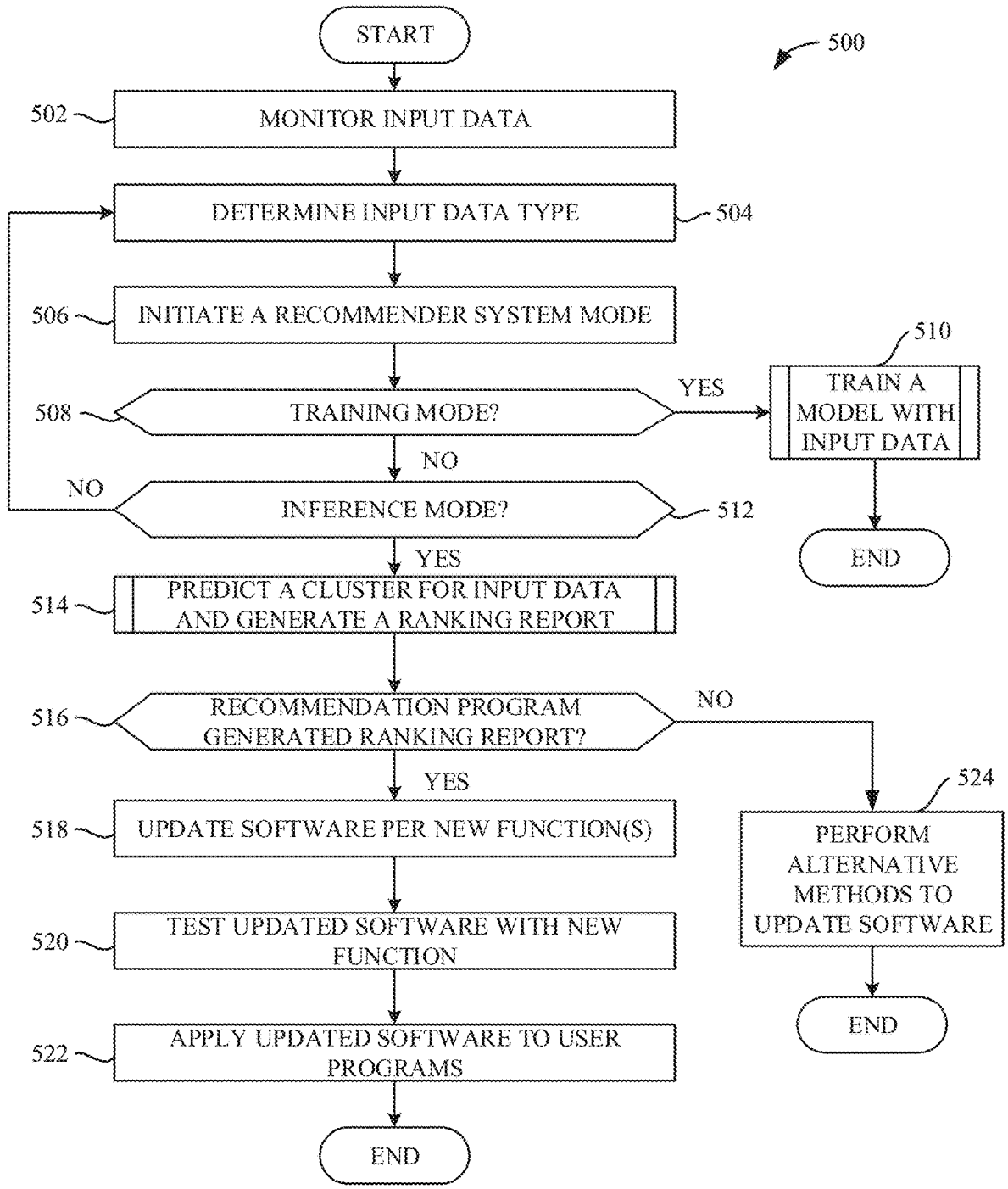
FIG. 5 is a flowchart representative of machine readable instructions which may be executed to implement the example updater system of FIG. 1 to update legacy software.

The program of FIG. 5 is a flowchart representative of machine readable instructions which may be executed to implement the example updater system 100 to receive input data to train and/or generate a report for software reusability. The program 500 of FIG. 5 begins when the example input determiner 106 receives and monitors incoming input data (Block 502). For example, the example enterprise software database 102 provides legacy software 103 to the input determiner 106 to be analyzed and the example cloud memory 104 provides new software 105 to the example input determiner 106 to train a model.

The example input determiner 106 determines the incoming input data type. (Block 504). For example, the input determiner 106 recognizes who/what is providing the software, such as the enterprise software database 102 or the cloud memory 104, and determines the type of input data coming in. In some examples, when the input determiner 106 recognizes that the enterprise software database 102 is providing software, the input determiner 106 determines the software is legacy software 103. In other examples, when the input determiner 106 recognizes that the cloud memory 104 is providing software, the input determiner 106 determines the software is new software 105. In this manner, the input determiner 106 provides a notification to the recommender system 108 to initiate a recommender system mode. (Block 506). For example, the input determiner 106 provides a message to the recommender system 108 indicative of a training mode or an inference mode, and provides the input data (e.g., the legacy software 103 or the new software 105) to the recommender system.

The example recommender system 108 receives the message and determines if the recommender system 108 is to enter training mode. (Block 508). For example, the recommender system 108 may analyze the message and determine the input determiner 106 is requesting the recommender system 108 to enter training mode (e.g., Block 508 returns a YES). The example recommender system 108 trains a model with the provided input data. (Block 510). For example the recommender system 108 utilizes methods and apparatus disclosed herein to implement a training mode which is further described in connection with program 600 of FIG. 6.

In some examples, the recommender system 108 analyzes the message provided by the input determiner 106 and determines to not enter training mode (e.g., Block 508 returns a NO). The example recommender system 108 determines if the input determiner 106 is requesting the recommender system to enter an inference mode. (Block 512). If the example recommender system 108 is not to enter an inference mode (e.g., Block 512 returns a NO), control returns to block 504. If the example recommender system 108 is to enter an inference mode (e.g., Block 512 returns a YES), then the example recommender system 108 predicts a cluster identifier for the input data and generates a ranking report based on the prediction. (Block 514). For example, the recommender system 108 utilizes methods and apparatus disclosed herein to perform the instructions of block 514, which is further described in connection with the program 700 of FIG. 7.

The example recommender system 108 determines if a ranking report was generated. (Block 516). For example, the recommender system 108 may generate a ranking report with a list of possible functions that may be utilized to update the legacy software 103 (e.g., Block 516 returns a YES). An example automated script may update software per the new functions described in the ranking report. (Block 518). In other examples, a developer may update the legacy software with the listed fixes.

The example testing system 110 tests the updated software with the new function. (Block 520). For example, the testing system 110 compiles the code in the new function to check for compile errors inside the function, and the testing system 110 checks for compliance issues, security issues, licensing issues, etc.

The example software applicator 112 applies the updated software to a user programs (block 522) if the testing system 110 approved the new functions. For example, the software applicator 112 modifies an operation of the legacy software 103 by implementing the new function into the system. The "system" may be the tasks and procedures combined to operate as the legacy software 103. The program of FIG. 5 ends when software maintenance is complete. The program of FIG. 5 may be repeated when the input determiner 106 is provided with software.

If the example recommender system 108 does not generate a ranking report (e.g., Block 516 returns a NO), then alternative methods to update software are performed. (Block 524). For example, the recommender system 108 may not include a sufficient inference model for the legacy software 103 due to lack of training data because access to new software in the cloud memory 104 is blocked, etc. Alternative methods may include a developer analyzing the input legacy software 103 and designing functions to update the legacy software 103. The program of FIG. 5 ends when alternative methods are to be taken to update the legacy software.

Figure 6:
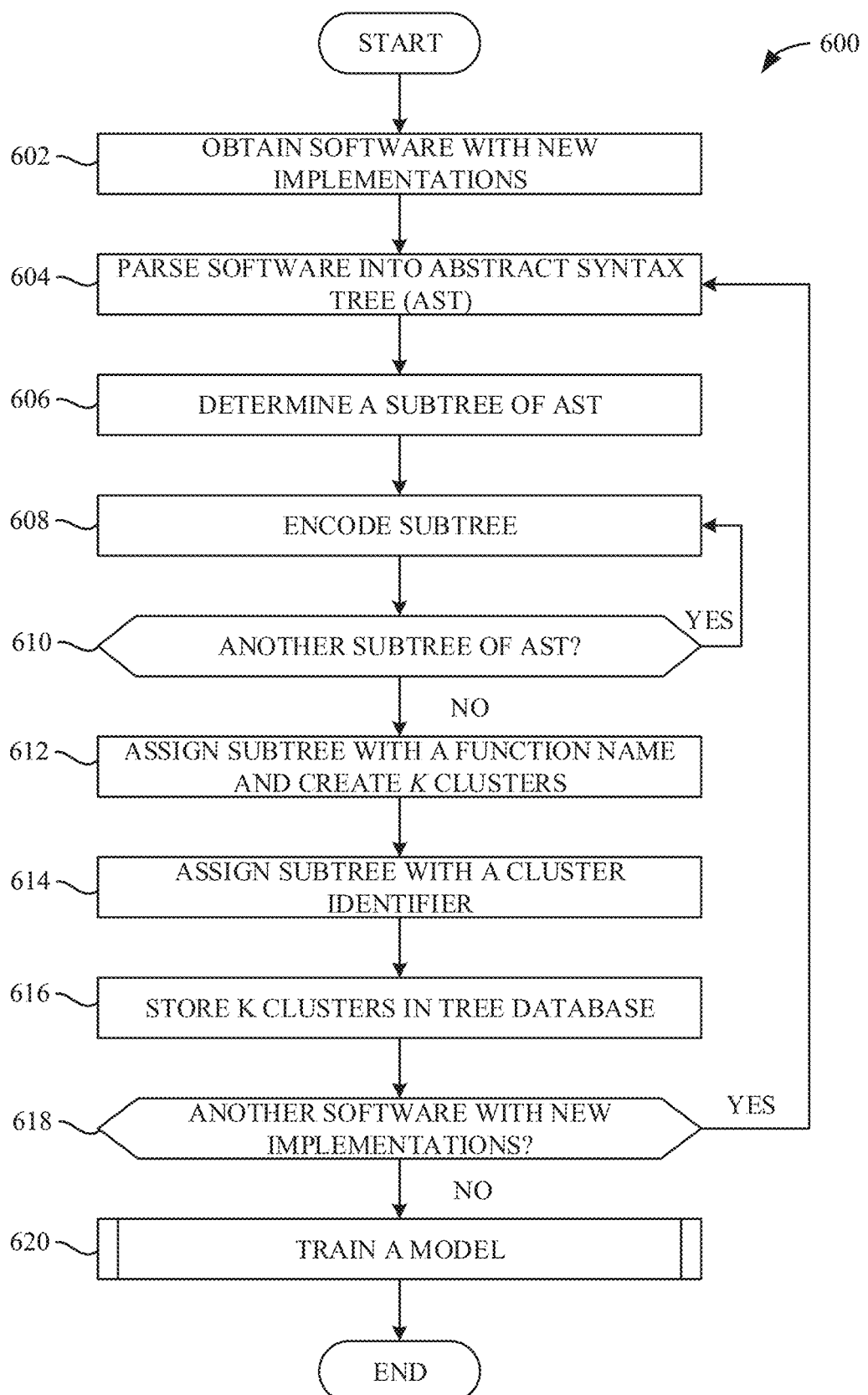
FIGS. 6 and 7 are flowcharts representative of machine readable instructions which may be executed to implement the example recommender system of FIG. 1 and/or FIG. 2 to train a model.
Figure 7:
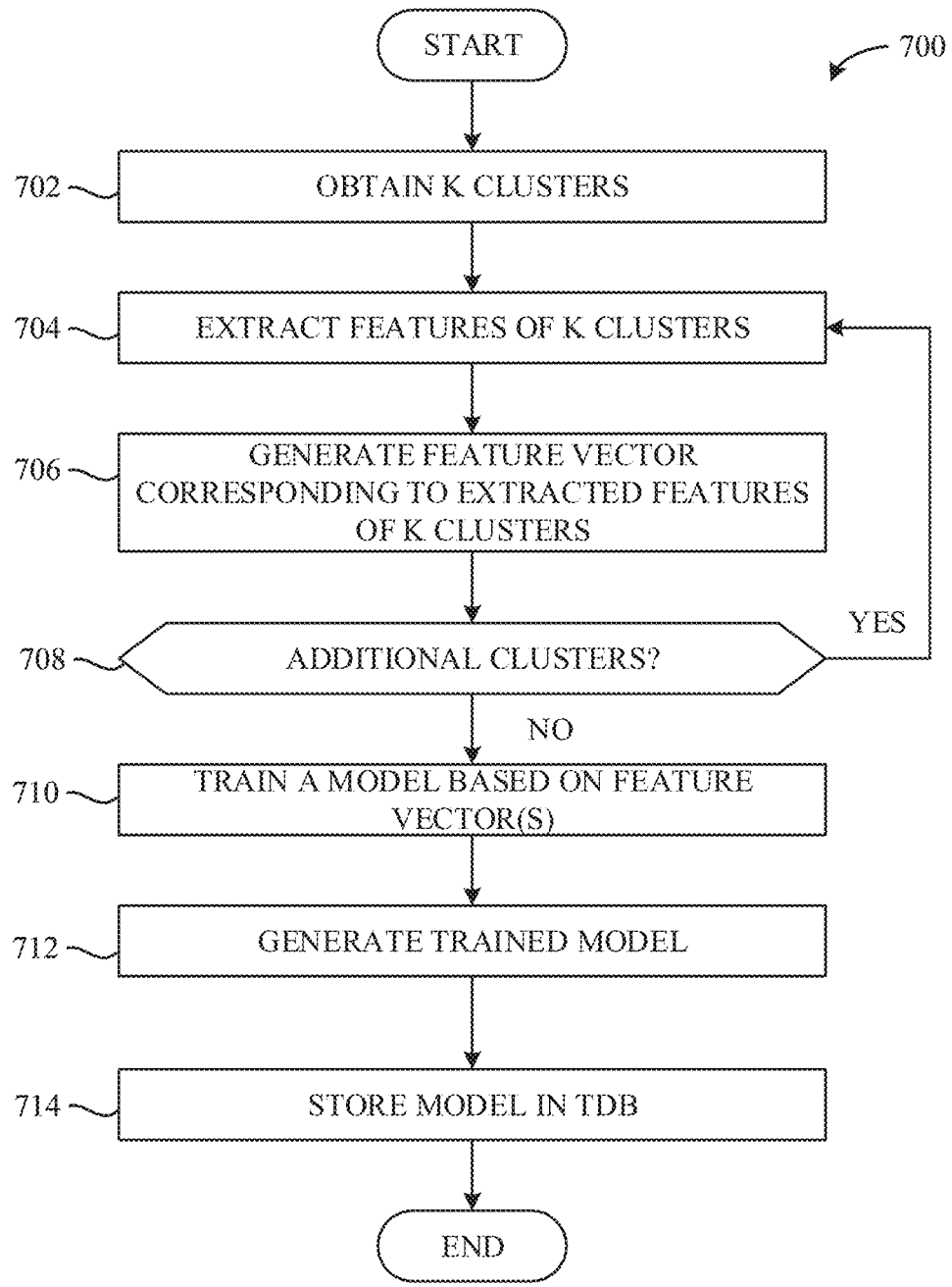

FIGS. 6 and 7 are flowcharts representative of machine readable instructions which may be executed to implement the example recommender system 108 and the example classifier 210 to populate the example TDB 208 and train a model. The program 600 of FIG. 6 begins when the example software parser 202 obtains software with new implementations. (Block 602). For example, the software parser 202 is provided with new software 105 from the example input determiner 106. The example software parser 202 parses the new software into an AST. (Block 604). For example, the software parser 202 is a compiler or an interpreter component that breaks data into smaller elements for simple translation into another language by forming subtrees of nodes.

The example subtree encoder 204 determines a subtree of the AST. (Block 606). For example, the subtree encoder 204 may sift through each subtree of the AST individually to perform encoding operations. The example subtree encoder 204 encodes the determined subtree. (Block 608). For example, the subtree encoder 204 transforms the subtree into a single fixed-length code vector. In some examples the subtree encoder 204 transforms the subtree into multiple single fixed-length code vectors depending on the functions of the subtree. The example subtree encoder 204 may determine if another subtree of the AST is to be encoded. (Block 610). If the there are more subtrees in the AST (e.g., Block 610 returns a YES), the example subtree encoder 204 encodes the subtree. (Block 608).

If the subtree encoder 204 determines there is not another subtree in the AST to encode (e.g., Block 610 returns a NO), the example function identifier 206 assigns the encoded subtree with a function name and creates k clusters. (Block 612). For example, the function identifier 206 analyzes the code vectors representative of the subtree to determine semantic properties, such as the type of function the subtree performs. Examples of function names include, but are not limited to, while loop, for loop, method invocation, if statement, parameter definer, etc. The example function identifier 206 then creates k clusters utilizing clustering algorithms. For example, the function identifier 206 utilizes k means clustering algorithm to group each subtree into a specific group, otherwise referred to as a cluster.

The example function identifier 206 assigns the subtree with a cluster identifier. (Block 614). For example, the function identifier 206 assigns a number of 1 to k to a subtree depending on the cluster they are "closest" to. For example, the k means clustering algorithm initializes a center point for each cluster, creates a plot with code vectors represented as data points, and determines what center point each data point is closest to. In this manner, the example function identifier 206 assigns a cluster identifier to each encoded subtree. (Block 614).

The example function identifier 206 stores k clusters in the example TDB 208. (Block 616). For example, the function identifier 206 provides the encoded subtrees (e.g., the code vectors) to the TDB 208 and maps the encoded subtrees to their respective function name and cluster identifier. The example software parser 202 determines if there is a different software with new implementations to analyze. (Block 618). For example, the cloud memory 104 may provide the input determiner 106 with another new software 105 (e.g., Block 618 returns YES). In this manner, the control returns to block 604 and the example software parser parses the software into an AST.

If the cloud memory 104 does not provide another new software 105 to the input determiner 106 (e.g., Block 618 returns a NO), the example function identifier 206 notifies the classifier 210 to train a model. (Block 620). In some examples, the TDB 208 may notify the classifier 210 to train a model based on how populated the TDB 208 is. For example, if the TDB 208 is at maximum storage capacity, the TDB 208 notifies the classifier 210 to retrieve training data. The example program 600 of FIG. 6 ends when the classifier 210 trains a model. The program 600 of FIG. 6 can be repeated when new software 105 is provided to the example input determiner 106 for purposes of learning.

Turning to FIG. 7, the program 700 begins when the example classifier 210 obtains k clusters. (Block 702). For example, the feature extractor 302 (FIG. 3), may receive k clusters from the TDB 208, wherein each cluster includes one or more encoded subtrees mapped to a function name and cluster identifier. The example feature extractor 302 extracts features of k clusters. (Block 704). For example, the feature extractor 302 extracts features of each encoded subtree (e.g., code vector) of one of k clusters representative of the function represented in the one of k clusters.

The example feature extractor 302 generates a feature vector corresponding to the extracted features of the one of k clusters. (Block 706). For example, the feature extractor 302 inserts the descriptive features of a cluster into a feature vector. The example feature extractor 302 determines if there are additional clusters to analyze. (Block 708). For example, the feature extractor 302 may determine not all of the k clusters have been analyzed (e.g., Block 708 returns a YES), and control returns to block 704.

If the example feature extractor 302 determines all of the clusters have been analyzed (e.g., Block 708 returns a NO) and each cluster includes a representative feature vector, then the example model trainer 304 (FIG. 3) trains a model based on the provided feature vectors. (Block 710). For example, the feature extractor 302 provides the feature vectors to the model trainer 304 to train a model to predict a cluster identifier for a given feature vector.

The example model trainer 304 provides the trained model to the model updater 306 (FIG. 3) to generate the trained model. (Block 712). For example, the model updater 306 flags the trained model as new and provides the trained model to the model generator 308 (FIG. 3) to generate the trained model. The example model generator 308 stores the trained model in the TDB 208 (block 714) for subsequent use by the classifier 210. For example, the model may be retrieved from the TDB 208 during an inference phase when the example classifier 210 is operating in the inference mode. The training phase of the program 700 of FIG. 7 ends when the model generator 308 stores the model in the TDB 208.

Figure 8:
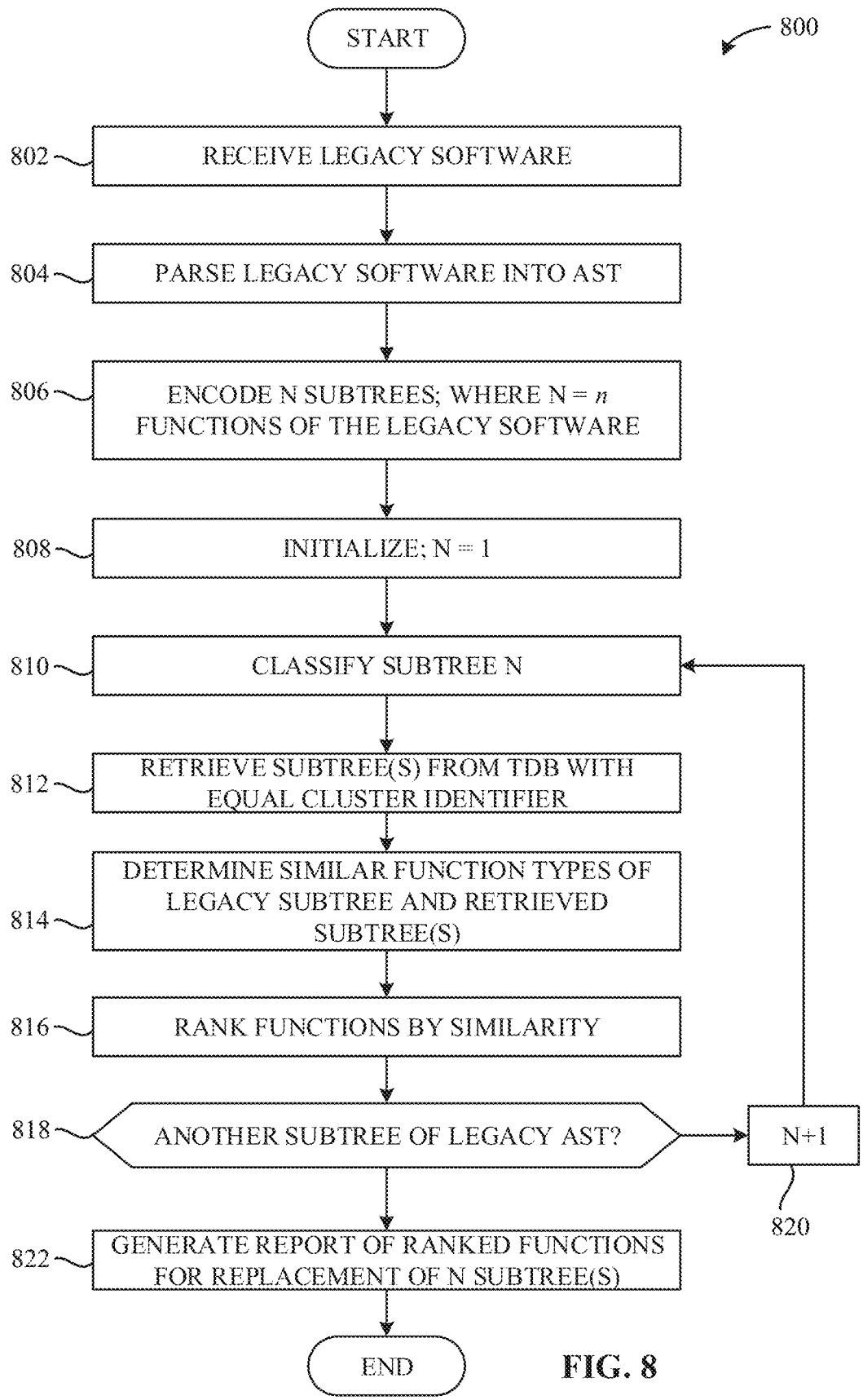
FIG. 8 is a flowchart representative of machine readable instructions which may be executed to implement the example recommender system of FIG. 1 and/or FIG. 2 to generate a ranking report.

FIG. 8 represents machine readable instructions executed to implement the example classifier 210 during an inference phase. The inference phase 800 of FIG. 8 begins when the example software parser 202 receives legacy software 103. (Block 802). For example, the input determiner 106 (FIG. 1) provides the software parser 202 with legacy software 103. The example software parser 202 parses the legacy software into a legacy AST. (Block 804). For example, the software parser 202 is a compiler or an interpreter component that breaks data into smaller elements for simple translation into another language by forming subtrees of nodes.

The example subtree encoder 204 receives the legacy AST and encodes N subtrees, where N=n functions of the legacy software 103. (Block 806). For example, the subtree encoder 204 may analyze each N subtree of the legacy AST and generate n legacy code vectors representative of a function or functions of the N subtree. The example classifier subtree encoder 204 initializes N=1. (Block 808). For example, the subtree encoder 204 retrieves the legacy code vector(s) of the first subtree in the legacy AST to be analyzed.

The example classifier 210 classifies subtree N. (Block 810). For example the classifier 210 enters an inference mode and the example feature extractor 302 (FIG. 4) extracts features of the n legacy code vectors to generate a feature vector representative of the N subtree. The example feature extractor 302 provides the feature vector to the example inference generator 404 (FIG. 4) to predict a cluster identifier for the subtree N based on the feature vector. For example, the inference generator 404 utilizes a trained model, such as a KNN, to generate a probability value indicative of the likelihood that the legacy subtree is in a certain group/class.

The example inference generator 404 assigns the N subtree with the predicted cluster identifier and notifies the example ranking generator 406 (FIG. 4) to retrieve subtrees from the TDB 208 with equal cluster identifiers. (Block 812). For example, the N subtree is assigned with cluster identifier "1" and the example ranking generator 406 retrieves the subtrees mapped to cluster identifier "1" in the TDB 208.

The example ranking generator 406 determines similar function types of legacy subtree and retrieved subtrees. (Block 814). For example, the ranking generator 406 utilizes the bigram string similarity measure algorithm to compare function names assigned to each subtree in the TDB 208 with the function name determined by the example subtree encoder 204 during the encoding process. The example ranking generator 406 proceeds to rank the function names of the retrieved subtrees by similarity to the legacy subtree. (Block 816). For example, if the ranking generator 406 utilizes the bigram string similarity measure algorithm, the ranking generator 406 lists the function names based on a distance score, wherein the function with the lowest score is ranked first and the function with the highest score is ranked last.

The example feature extractor 302 determines if there is another subtree of legacy AST to analyze. (Block 818). For example, the AST may include a plurality of subtrees, denoted as N subtrees, and the feature extractor 302 is provided with another subtree (e.g., Block 818 returns a YES). The example subtree encoder 204 increments N by 1. (Block 820). For example, the subtree encoder 204 retrieves the next subtree of the legacy AST to provide to the example feature extractor 302.

When the example feature extractor 302 determines there are is no more input data (e.g., N subtrees have been analyzed and Block 818 returns a NO), the example ranking generator 406 generates a report of ranked functions for replacement of N subtrees. (Block 822). For example, the report may be a list, multiple lists, ranked in ascending order by function names, and provided via a user interface to a developer as a recommendation as to what functions may fix the input legacy software 103. In other examples, the report may be generated for an automated script to check all the functions and find the fix that transforms the legacy software into an improved implementation. The inference phase 800 of FIG. 8 ends after a ranking report has been generated. The inference phase 800 is repeated when another legacy software is provided to the recommendation system 108.

FIG. 9 is a block diagram of an example processor platform 900 structured to execute the instructions of FIGS. 5, 6, 7, and 8 to implement the software updater system 100, the recommendation system 108, and the classifier 210 of FIGS. 1, 2, 3, and 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input determiner 106, the example recommender system 108, the example testing system 110, and the example system applicator 112.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 5, 6, 7, and 8 may be stored in the mass storage device 928, in the volatile memory 914, in the non-volatile memory 916, and/or on a removable non-transitory computer readable storage medium such as a CD or DVD.

Example methods, apparatus, systems, and articles of manufacture for evolving computer programs are disclosed herein. Further examples and combinations thereof include the following: Example 1 includes an apparatus comprising a software parser to generate a plurality of abstract syntax trees (ASTs) based on a plurality of software files, the ASTs including a plurality of subtrees corresponding to a plurality of functions of the software files, a subtree encoder to generate a plurality of code vectors representative of one or more semantic properties of the plurality of subtrees, a function identifier to determine a plurality of clusters for the plurality of subtrees, the function identifier to assign a cluster identifier and a function label to the plurality of subtrees, a tree database to store the plurality of subtrees and map the plurality of subtrees to respective ones of cluster identifiers and function names, and a processor to train a model based on a feature vector and the plurality of clusters stored in the tree database, the feature vector including descriptive information corresponding to a function of at least one of the plurality of clusters, and predict the cluster identifier for at least one of the plurality of subtrees, based on the trained model, to identify a name of the function.

Example 2 includes the apparatus of example 1, wherein the processor includes a model trainer to train the model based on a k-nearest neighbors algorithm (KNN).

Example 3 includes the apparatus of example 1, further including a feature extractor to receive a plurality of subtrees from at least one of the tree database or the subtree encoder to extract features of the subtrees.

Example 4 includes the apparatus of example 3, wherein the feature extractor initiates a training mode when the subtrees are retrieved from the tree database and initiates an inference mode when the subtrees are provided by the subtree encoder.

Example 5 includes the apparatus of example 1, wherein the processor further includes an inference generator in an inference mode to utilize the trained model to predict a cluster identifier based on a feature vector.

Example 6 includes the apparatus of example 1, further including a ranking generator to determine a list of functions in a cluster that can replace a function corresponding to a legacy software.

Example 7 includes the apparatus of example 6, wherein the ranking generator ranks the list of functions based on text-based similarity between functions in the list of functions and the function corresponding to the legacy software.

Example 8 includes a non-transitory computer readable storage medium comprising instructions that, when executed, cause a processor to at least parse a software file into a plurality of abstract syntax trees (ASTs), the ASTs including a plurality of subtrees corresponding to a plurality of functions of the software files, generate a plurality of code vectors representative of one or more semantic properties of the plurality of subtrees, identify a plurality of clusters for the plurality of subtrees, assign a cluster identifier and a function label to the plurality of subtrees, store the plurality of subtrees into a tree database and map the plurality of subtrees to respective ones of cluster identifiers and function names, train a model based on a feature vector and the plurality of clusters stored in the tree database, the feature vector including descriptive information corresponding to a function of at least one of the plurality of clusters, and predict the cluster identifier for at least one of the plurality of subtrees, based on the trained model, to identify a name of the function.

Example 9 includes the non-transitory computer readable storage medium as defined in example 8, wherein the instructions, when executed, cause the processor to train the model based on a k-nearest neighbors algorithm (KNN).

Example 10 includes the non-transitory computer readable storage medium as defined in example 8, wherein the instructions, when executed, cause the processor to retrieve a plurality of subtrees from at least one of the tree database or the subtree encoder to extract features of the subtrees.

Example 11 includes the non-transitory computer readable storage medium as defined in example 10, wherein the instructions, when executed, cause the processor to enter a training mode when the subtrees are retrieved from the tree database and enter an inference mode when the subtrees are retrieved from the subtree encoder.

Example 12 includes the non-transitory computer readable storage medium as defined in example 8, wherein the instructions, when executed, cause the processor to determine a list of functions in a cluster that can replace a function corresponding to a legacy software.

Example 13 includes the non-transitory computer readable storage medium as defined in example 12, wherein the instructions, when executed, cause the processor to rank the list of functions based on text-based similarity between functions in the list of functions and the function corresponding to the legacy software.

Example 14 includes the non-transitory computer readable storage medium as defined in example 8, wherein the instructions, when executed, cause the processor to generate a viewable list of functions for a developer to review.

Example 15 includes a method comprising parsing a software file into a plurality of abstract syntax trees (ASTs), the ASTs including a plurality of subtrees corresponding to a plurality of functions of the software files, generating a plurality of code vectors representative of one or more semantic properties of the plurality of subtrees, identifying a plurality of clusters for the plurality of subtrees, assigning a cluster identifier and a function label to the plurality of subtrees, storing the plurality of subtrees into a tree database and map the plurality of subtrees to respective ones of cluster identifiers and function names, training a model based on a feature vector and the plurality of clusters stored in the tree database, the feature vector including descriptive information corresponding to a function of at least one of the plurality of clusters, and predicting the cluster identifier for at least one of the plurality of subtrees, based on the trained model, to identify a name of the function.

Example 16 includes the method of example 15, further including utilizing a k-nearest neighbors algorithm (KNN) to train the model.

Example 17 includes the method of example 15, further including retrieving a plurality of subtrees from at least one of the tree database or a subtree encoder to extract features of the subtrees.

Example 18 includes the method of example 17, further including initiating a training mode when the subtrees are retrieved from the tree database and initiating an inference mode when the subtrees are retrieved from the subtree encoder.

Example 19 includes the method of example 15, further including determining a list of functions in a cluster that can replace a function corresponding to a legacy software.

Example 20 includes the method of example 19, further including ranking the list of functions based on text-based similarity between functions in the list of functions and the function corresponding to the legacy software.

Example 21 includes an apparatus comprising for evolving computer programs, the apparatus comprising means for parsing, the means for parsing to parse a plurality of abstract syntax trees (ASTs) based on a plurality of software files, the ASTs including a plurality of subtrees corresponding to a plurality of functions of the software files, means for encoding, the means for encoding to generate a plurality of code vectors representative of one or more semantic properties of the plurality of subtrees, means for determining, the means for determining to determine a plurality of clusters for the plurality of subtrees and to assign a cluster identifier and a function label to the plurality of subtrees, means for storing, the means for storing to store the plurality of subtrees and map the plurality of subtrees to respective ones of cluster identifiers and function names, and means for processing, the means for processing to train a model based on a feature vector and the plurality of clusters, the feature vector including descriptive information corresponding to a function of at least one of the plurality of clusters, and predict the cluster identifier for at least one of the plurality of subtrees, based on the trained model, to identify a name of the function. The example means for parsing may be implemented by the example software parser 202 of FIG. 2. The example means for encoding may be implemented by the example subtree encoder 204 of FIG. 2. The example means for determining may be implemented by the example function identifier 206 of FIG. 2. The example means for storing may be implemented by the example tree database 208 of FIG. 2. The example means for processing may be implemented by the example classifier 210 of FIGS. 2 and 3.

Example 22 includes the apparatus of example 21, wherein the means for processing are to train the model based on a k-nearest neighbors algorithm (KNN).

Example 23 includes the apparatus of example 21, wherein the means for processing are to operate in an inference mode to utilize the trained model to predict a cluster identifier based on a feature vector.

Example 24 includes the apparatus of example 21, further including a means for generating, the means for generating to determine a list of functions in a cluster that can replace a function corresponding to a legacy software. The example means for generating may be implemented by the example ranking generator 406 of FIG. 4.

Example 25 includes the apparatus of example 24, wherein the means for generating are to list of functions based on text-based similarity between functions in the list of functions and the function corresponding to the legacy software.

From the foregoing, it will be appreciated that example methods, apparatus and articles of manufacture have been disclosed that identify fixes to legacy software for the purpose of software reusability and timeliness. The disclosed methods, apparatus and articles of manufacture improve the efficiency of software reusability and maintenance timeliness by accessing functions available in accessible software databases to train a machine learning model to predict matches with functions of old software. Examples disclosed herein generate a report of functions that would improve the old functions. In this manner, a developer does not waste time attempting to learn new software and therefore increases the efficiency of the computing device running on the older software by narrowing an abundance of information corresponding to a plurality of new software into a few relevant new software solutions. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    parsing a software file into a plurality of abstract syntax trees (ASTs), the ASTs including a plurality of subtrees corresponding to a plurality of functions of the software files;
    generating a plurality of code vectors representative of one or more semantic properties of the plurality of subtrees;
    identifying a plurality of clusters for the plurality of subtrees;
    assigning a cluster identifier and a function label to the plurality of subtrees;
    storing the plurality of subtrees into a tree database and mapping the plurality of subtrees to respective ones of cluster identifiers and function names;
    training a model based on a feature vector and the plurality of clusters stored in the tree database, the feature vector including descriptive information corresponding to a function of at least one of the plurality of clusters; and
    predicting the cluster identifier for at least one of the plurality of subtrees, based on the trained model, to identify a name of the function.

2. The method of claim 1, further including utilizing a k-nearest neighbors algorithm (KNN) to train the model.

3. The method of claim 1, further including retrieving a plurality of subtrees from at least one of the tree database or a subtree encoder to extract features of the subtrees.

4. The method of claim 3, further including initiating a training mode when the subtrees are retrieved from the tree database and initiating an inference mode when the subtrees are retrieved from the subtree encoder.

5. The method of claim 1, further including determining a list of functions in a cluster that can replace a function corresponding to a legacy software.

6. The method of claim 5, further including ranking the list of functions based on text-based similarity between functions in the list of functions and the function corresponding to the legacy software.

7. An apparatus comprising:
    a software parser to generate a plurality of abstract syntax trees (ASTs) based on a plurality of software files, the ASTs including a plurality of subtrees corresponding to a plurality of functions of the software files;
    a subtree encoder to generate a plurality of code vectors representative of one or more semantic properties of the plurality of subtrees;
    a function identifier to determine a plurality of clusters for the plurality of subtrees, the function identifier to assign a cluster identifier and a function label to the plurality of subtrees;
    a tree database to store the plurality of subtrees and map the plurality of subtrees to respective ones of cluster identifiers and function names; and
    a processor to:
        train a model based on a feature vector and the plurality of clusters stored in the tree database, the feature vector including descriptive information corresponding to a function of at least one of the plurality of clusters; and
        predict the cluster identifier for at least one of the plurality of subtrees, based on the trained model, to identify a name of the function.

8. The apparatus of claim 7, wherein the processor includes a model trainer to train the model based on a k-nearest neighbors algorithm (KNN).

9. The apparatus of claim 7, further including a feature extractor to receive a plurality of subtrees from at least one of the tree database or the subtree encoder to extract features of the subtrees.

10. The apparatus of claim 9, wherein the feature extractor is to initiate a training mode when the subtrees are retrieved from the tree database and initiates an inference mode when the subtrees are provided by the subtree encoder.

11. The apparatus of claim 7, wherein the processor further includes an inference generator in an inference mode to utilize the trained model to predict a cluster identifier based on a feature vector.

12. The apparatus of claim 7, further including a ranking generator to determine a list of functions in a cluster that can replace a function corresponding to a legacy software.

13. The apparatus of claim 12, wherein the ranking generator is to rank the list of functions based on text-based similarity between functions in the list of functions and the function corresponding to the legacy software.

14. A non-transitory computer readable storage medium comprising instructions that, when executed, cause a processor to at least:
    parse a software file into a plurality of abstract syntax trees (ASTs), the ASTs including a plurality of subtrees corresponding to a plurality of functions of the software files;
    generate a plurality of code vectors representative of one or more semantic properties of the plurality of subtrees;
    identify a plurality of clusters for the plurality of subtrees;
    assign a cluster identifier and a function label to the plurality of subtrees;
    store the plurality of subtrees into a tree database and map the plurality of subtrees to respective ones of cluster identifiers and function names;
    train a model based on a feature vector and the plurality of clusters stored in the tree database, the feature vector including descriptive information corresponding to a function of at least one of the plurality of clusters; and
    predict the cluster identifier for at least one of the plurality of subtrees, based on the trained model, to identify a name of the function.

15. The non-transitory computer readable storage medium as defined in claim 14, wherein the instructions, when executed, cause the processor to train the model based on a k-nearest neighbors algorithm (KNN).

16. The non-transitory computer readable storage medium as defined in claim 14, wherein the instructions, when executed, cause the processor to retrieve a plurality of subtrees from at least one of the tree database or a subtree encoder to extract features of the subtrees.

17. The non-transitory computer readable storage medium as defined in claim 16, wherein the instructions, when executed, cause the processor to enter a training mode when the subtrees are retrieved from the tree database and enter an inference mode when the subtrees are retrieved from the subtree encoder.

18. The non-transitory computer readable storage medium as defined in claim 14, wherein the instructions, when executed, cause the processor to determine a list of functions in a cluster that can replace a function corresponding to a legacy software.

19. The non-transitory computer readable storage medium as defined in claim 18, wherein the instructions, when executed, cause the processor to rank the list of functions based on text-based similarity between functions in the list of functions and the function corresponding to the legacy software.

20. The non-transitory computer readable storage medium as defined in claim 14, wherein the instructions, when executed, cause the processor to generate a viewable list of functions for a developer to review.

21. An apparatus for evolving computer programs, the apparatus comprising:
    means for parsing, the means for parsing to parse a plurality of abstract syntax trees (ASTs) based on a plurality of software files, the ASTs including a plurality of subtrees corresponding to a plurality of functions of the software files;
    means for encoding, the means for encoding to generate a plurality of code vectors representative of one or more semantic properties of the plurality of subtrees;
    means for determining, the means for determining to determine a plurality of clusters for the plurality of subtrees and to assign a cluster identifier and a function label to the plurality of subtrees;
    means for storing, the means for storing to store the plurality of subtrees and map the plurality of subtrees to respective ones of cluster identifiers and function names; and
    means for processing, the means for processing to:
        train a model based on a feature vector and the plurality of clusters, the feature vector including descriptive information corresponding to a function of at least one of the plurality of clusters; and
        predict the cluster identifier for at least one of the plurality of subtrees, based on the trained model, to identify a name of the function.

22. The apparatus of claim 21, wherein the means for processing are to train the model based on a k-nearest neighbors algorithm (KNN).

23. The apparatus of claim 21, wherein the means for processing are to operate in an inference mode to utilize the trained model to predict a cluster identifier based on a feature vector.

24. The apparatus of claim 21, further including a means for generating, the means for generating to determine a list of functions in a cluster that can replace a function corresponding to a legacy software.

25. The apparatus of claim 24, wherein the means for generating are to list functions based on text-based similarity between functions in the list of functions and the function corresponding to the legacy software.

* * * * *